United States Patent
Yamashita et al.

(10) Patent No.: US 7,522,809 B2
(45) Date of Patent: Apr. 21, 2009

(54) PLANAR LIGHT SOURCE AND LIGHT GUIDE FOR USE THEREIN

(75) Inventors: Tomoyoshi Yamashita, Kanagawa (JP); Masae Ono, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 190 days.

(21) Appl. No.: 10/514,787

(22) PCT Filed: May 20, 2003

(86) PCT No.: PCT/JP03/06268

§ 371 (c)(1), (2), (4) Date: Nov. 19, 2004

(87) PCT Pub. No.: WO03/098100

PCT Pub. Date: Nov. 27, 2003

(65) Prior Publication Data

US 2005/0254771 A1    Nov. 17, 2005

(30) Foreign Application Priority Data

May 20, 2002    (JP)    ............................. 2002-144712

(51) Int. Cl.
 - *G02B 6/32* (2006.01)
 - *G02B 6/00* (2006.01)
 - *F21V 7/04* (2006.01)

(52) U.S. Cl. .......................... 385/146; 385/33; 362/615

(58) Field of Classification Search .................. None
See application file for complete search history.

(56) References Cited

U.S. PATENT DOCUMENTS 5,598,280 A * 1/1997 Nishio et al. .................. 349/57

(Continued)

FOREIGN PATENT DOCUMENTS

JP    02-084618 A    3/1990

(Continued)

OTHER PUBLICATIONS

English Translation for JP 11-203923 (OMRON Corp) Jul. 30, 1999, [online], [retrieved on Dec. 26, 2006] Retrieved from the PAJ Database of the Japanese Patent Office using Internet <URL: http://www19.ipdl.ncipi.go.jp/PA1/cgi-bin/PA1INDEX>.*

(Continued)

*Primary Examiner*—Omar Rojas
(74) *Attorney, Agent, or Firm*—Morgan, Lewis & Bockius LLP

(57) ABSTRACT

A planar light guide (4) having a light entrance end face (41) receiving light from a spot-like primary light source and a light exit face (43) outputting the entered light, wherein a plurality of lens arrays (42) are formed, at least a part of the light entrance end face, to extend from the light exit face toward the opposite face substantially in parallel with each other. The lens array (42) has an asymmetric cross-sectional shape defined by a combination of at least two different curves. When the light guide (4) is combined with a primary light source disposed oppositely to the light entrance end face (41) and a light deflecting element disposed oppositely to the-light exit face (43), a high quality planar light source having a high uniformity and no variation in luminance is provided even when a relative small number of spot-like light sources are used as the primary light source.

8 Claims, 6 Drawing Sheets

U.S. PATENT DOCUMENTS 5,889,613 A * 3/1999 Watanabe .................. 359/456
6,669,350 B2 * 12/2003 Yamashita et al. .......... 362/612

FOREIGN PATENT DOCUMENTS

| | | |
|---|---|---|
| JP | 7-270624 A | 10/1995 |
| JP | 09-113907 A | 5/1997 |
| JP | 10-153778 A | 6/1998 |
| JP | 08-254618 A | 10/1998 |
| JP | 10-293202 A | 11/1998 |
| JP | 11-203923 | 7/1999 |
| JP | 11-265610 | 9/1999 |
| JP | 2001-357714 | 12/2001 |
| JP | 2002-42529 | 2/2002 |
| JP | 2003-502716 | 1/2003 |

OTHER PUBLICATIONS

Partial English Translation for JP 11-265610 (ENPLAS Corp) Sep. 28, 1999, [online], [retrieved on Aug. 10, 2007] Retrieved from the PAJ Database of the Japanese Patent Office using Internet <URL: http://www.ipdl.inpit.go.jp/homepg_e.ipdl>.*

* cited by examiner

PLANAR LIGHT SOURCE AND LIGHT GUIDE FOR USE THEREIN

TECHNICAL FIELD

The present invention relates to a planar light source device and a light guide for use therein, preferable for a liquid crystal display device for use in a notebook-size personal computer, liquid crystal television or the like, and a comparatively small liquid crystal display device using a substantially spot-like primary light source such as an LED for use as a display for electronic portable devices such as a cellular phone, a portable information terminal (personal digital assistants), and a portable game machine, and an indicator for various electric/electronic devices, and particularly to a planar light source device capable of providing high-quality illumination having high uniformity.

BACKGROUND ART

In recent years, a liquid crystal display device has been broadly used as a monitor of a portable notebook-size personal computer or the like, or a display unit of liquid crystal television, video integrated type liquid crystal television or the like and further in other various fields. The liquid crystal display device basically comprises a backlight unit and a liquid crystal display element unit. As the backlight unit, an edge lighting system has been frequently used from a viewpoint of miniaturization of the liquid crystal display device. As the backlight, a type has heretofore been utilized in which at least one end face of a rectangular planar light guide is used as a light entrance end face, a linear or rod-like primary light source such as a straight-tube type fluorescent lamp is disposed along the light entrance end face, and light emitted from the primary light source is introduced into the light guide from the light entrance end face of the light guide. The light is emitting from a light exit face which is one of two main surfaces of the light guide.

On the other hand, in recent years, miniaturization and reduction of power consumption have been demanded with respect to liquid crystal display devices having comparatively small screen dimensions for portable electronic devices such as a cellular phone, a portable information terminal, and a portable game machine or indicators of various types of electric/electronic devices. Therefore, a light emitting diode (LED) which is a spot-like light source has been used as a primary light source of backlight for reduction of power consumption. As the backlight using the LED as the primary light source, as described, for example, in JP(A)-7-270624, one-dimensional arrangement of a plurality of LEDs along the light entrance end face of the light guide has been used in order to exert a function similar to that of backlight using a linear primary light source. When the primary light source by the one-dimensional arrangement of a plurality of LEDs is used in this manner, a required quantity of light and uniformity of a luminance distribution over a whole screen can be obtained.

Furthermore, there has been a demand for further reduction of power consumption in the case of a small liquid crystal display device, and the number of the LEDs for use needs to be reduced in order to meet the demand. However, when the number of the LEDs is reduced, a distance between light emitting points lengthens, therefore a region of the light guide corresponding to a region between the adjacent light emitting points enlarges, and intensity of the light output from the light guide region in a desired direction drops. This brings about nonuniformity (i.e., nonuniformity of luminance uniformity ratio) of a luminance distribution in light emitting surface of the planar light source device. In JP(B)-7-27137, a method has been proposed using a light guide whose light exit face comprises a rough surface. A prism sheet in which a large number of elongated prisms are arranged is disposed on the light exit face of the light guide in such a manner as to dispose the face on which the elongated prism is formed on a light guide side, accordingly power consumption of backlight is suppressed, and distribution of output light is narrowed not to sacrifice luminance as much as possible. In this backlight, high luminance is obtained with small power consumption. However, when the number of the LEDs for use is reduced, the nonuniformity of the luminance distribution of the output light from the light guide is easily visually recognized through a prism sheet.

Causes for the nonuniformity of the luminance distribution are that the light emitted from each LED disposed on the light entrance end face of the light guide has directivity and that spread of the light which has entered the light guide is comparatively reduced by a refraction function during entrance into the light guide. That is, as shown in FIG. 13, light emitted from a plurality of LEDs 2 exits from a large part of an effective light emitting region 100 of a light guide 4 corresponding to a display region of a liquid crystal display element to form a bright part 101, but a dark part 102 is generated outside the LEDs 2 of opposite ends. The dark part is remarkably generated in a case where the number of the LEDs for use is reduced in order to reduce power consumption, or the LEDs are disposed in the vicinity of the light guide.

Moreover, it has been described in JP(A)-10-293202 that a plurality of grooves are formed in a thickness direction of the light guide in the light entrance end face of the light guide in order to reduce luminance unevenness based on the dark part formed in the light guide corresponding a region between a plurality of spot-like light sources. However, this groove has a symmetric cross section, the light is uniformly diffused on opposite sides, and therefore the dark part formed in a specific region of the light guide, for example, a corner portion cannot be sufficiently eliminated.

As described above, it has been difficult to realize both reduction of power consumption and maintenance of uniformity of luminance in the conventional backlight using the spot-like light source as the primary light source.

Moreover, even in the backlight using a linear light source such as a cold cathode tube as the primary light source, there has been a problem that a sufficient quantity of light does not reach light guide corner portions in the vicinity of opposite end portions of the linear or rod-like primary light source or a region in the vicinity of a side end face adjacent to the light entrance end face of the light guide, and the luminance of the portion or the region easily drops. As a method of eliminating the dark part in the vicinity of the light entrance end face, a method of roughening the surface of the light guide in the vicinity of the entrance face has been proposed, for example, in JP(A)-10-153778. However, in this method, the above-described dark part cannot be eliminated in the backlight using a spot-like light source such as an LED as the primary light source.

Moreover, in JP(A)-8-254618 and JP(A)-10-153778, it has been described that a plurality of grooves in a thickness direction of the light guide are formed in the light entrance end face of the light guide in order to enhance the luminance or especially to eliminate the luminance drop in the vicinity of opposite ends of the light entrance end face of the light guide in the planar light source device using a linear primary light source such as a cold cathode tube. However, the groove has a symmetric shape such as a triangular or circular shape, and uniformly diffuses the light on opposite sides. Therefore, the dark part formed in the corner portion of the light guide cannot be sufficiently eliminated in the planar light source device using a spot-like primary light source such as an LED.

Moreover, it has been described in JP(A)-9-113907 that a plurality of structures each having an asymmetric cross-sectional shape such as a semicircular or triangular shape and extending in a thickness direction of the light guide are formed on the light entrance end face of the light guide in order to eliminate the luminance drop in the vicinity of an electrode of the cold cathode tube in the planar light source device using the cold cathode tube as the primary light source. However, in this structure, the light is diffused only on one side, and the light is not diffused substantially on the other side. Therefore, the dark part is easily formed in the region of the light guide corresponding to the region between the adjacent LEDs in a case where the structures are applied to the planar light source device using a small number of spot-like primary light sources such as LEDs.

DISCLOSURE OF THE INVENTION

To solve the problem, an object of the present invention is to provide a high-quality planar light source device which eliminates nonuniformity of uniformity ratio of luminance accompanying use of a small number of spot-like primary light sources for reduction of power consumption of the above-described planar light source device.

That is, according to the present invention, there is provided a planar light guide for a planar light source device, having a light entrance end face receiving light from a substantially spot-like primary light source and a light exit face outputting the light which is incident on the light entrance end face, wherein a plurality of elongated lenses are formed on at least a part of the light entrance end face to extend from the light exit face toward the opposite face substantially in parallel with each other, and each of the elongated lenses has an asymmetric cross-sectional shape defined by a combination of at least two different curves. According to the present invention, there is provided a planar light source device comprising: the above-described light guide; a primary light source disposed in such a manner as to face the light entrance end face of the light guide; and a light deflecting element disposed so as to face the light exit face of the light guide.

According to the above-described present invention, there can be provided a high quality planar light source device having a high uniformity without any variation in luminance, even when a relative small number of spot-like light sources are used as the primary light source.

BEST MODE FOR CARRYING OUT THE INVENTION

Embodiments of the present invention will be described hereinafter in detail with reference to the drawings.

Figure 1:
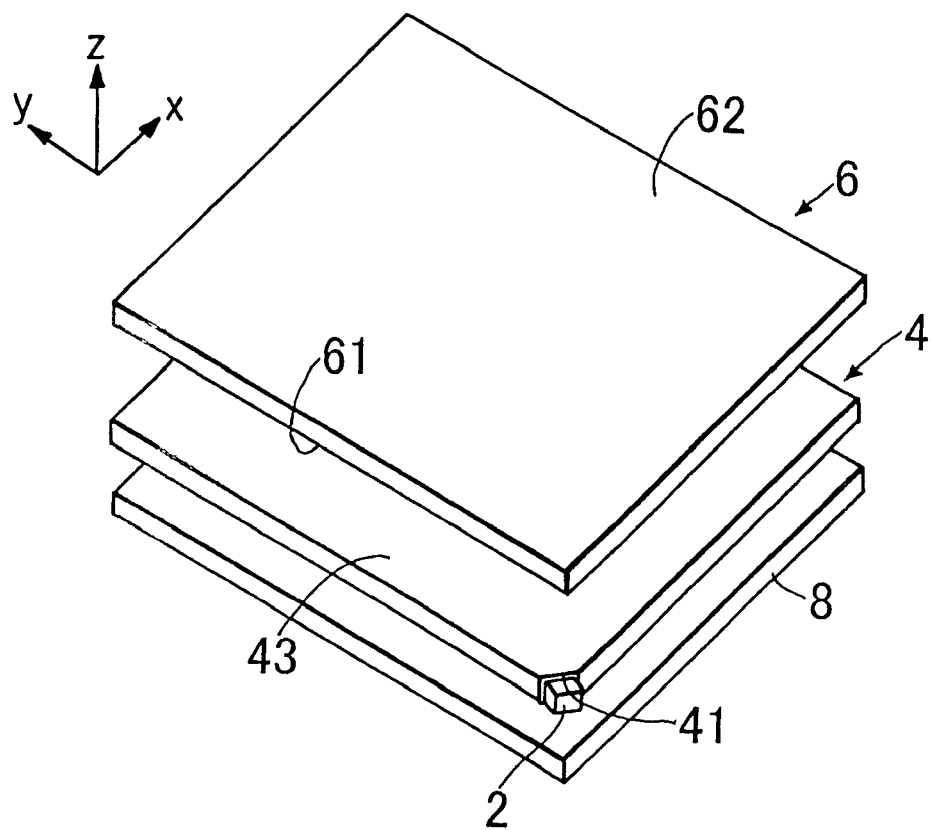
FIG. 1 is an exploded perspective view showing a planar light source device of the present invention.

FIG. 1 is an exploded perspective view showing one embodiment of a planar light source device according to the present invention. As shown in FIG. 1, the planar light source device of the present embodiment comprises: an LED 2 which is a substantially spot-like primary light source; a substantially rectangular planar light guide 4 in an XY plane, which allows light emitted from the LED 2 to enter through a light entrance end face 41, guides the light, and outputs the light from a light exit face 43; and a light deflecting element 6 and a light reflecting element 8 disposed adjacent to the light guide 4.

Figure 2:
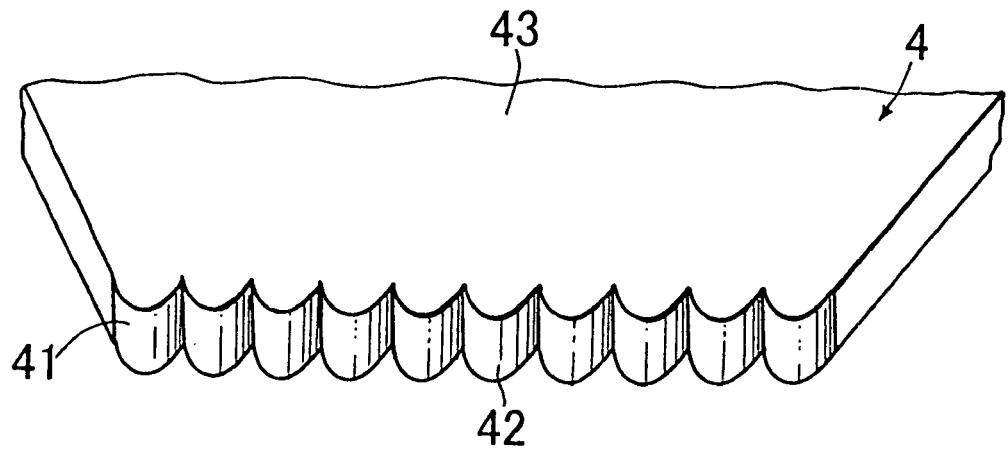
FIG. 2 is an enlarged perspective view of a light entrance end face of a light guide of the present invention.

The light guide 4 has two upper/lower main faces and ends connecting outer peripheral edges of the main faces to each other, and the end formed by cutting one corner portion is constituted as the light entrance end face 41. The LED 2 is disposed in such a manner as to face the light entrance end face 41. That is, the light entrance end face 41 is formed on the end of the light guide 4 corresponding to a position where the LED 2 is disposed. On the light entrance end face 41, as shown in FIG. 2, a plurality of lens arrays or elongated lenses 42 are formed on at least portions facing the LED 2 and extending from the light exit face to the opposite face. The elongated lenses, having an asymmetric cross-sectional shape defined by a combination of at least two different curves, are formed substantially in parallel with one another. In a case where the light entrance end face 41 is a flat face, an angular distribution of intensity of light which has entered the light guide 4 becomes narrower than that of light emitted from the LED 2 by a refraction function during the entrance into the light guide 4. However, since the elongated lens 42 is formed on the light entrance end face 41, the angular distribution (orientation distribution especially in an XY plane) of the intensity of light which has entered the light guide 4 can be expanded. When the cross-sectional shape of the elongated lens 42 is formed to be asymmetric, the quantity of light output in each direction can be adjusted, and uniformity of luminance in the whole light exit face of the light guide 4 can be enhanced. Furthermore, the elongated lens 42 is formed by at least two different curved faces in order to broaden the angular distribution of the light intensity.

The refraction function of the elongated lens 42 is uniquely determined by a relative positional relation with respect to the LED 2. Therefore, when a pitch of the elongated lens 42 is excessively large with respect to the LED 2, nonuniformity by a spread of light ray based on the positional relation is visually recognized. Therefore, the pitch of the elongated lens 42 is preferably small. However, when the pitch is excessively small, it becomes difficult to transfer the shape of the elongated lens 42 during preparation of the light guide, and drop of shape precision is caused. Therefore, the pitch of the elongated lens 42 is in a range of preferably 10 to 200 µm, more preferably 20 to 100 µm, further preferably 30 to 60 µm.

Examples of a preferable sectional shape of the elongated lens 42 include a combined shape of two different curves, a combined shape of two or more different parts of circle (arc) and/or non-circle (non-arc), a shape comprising the arc and a part of an ellipse, a combined shape of a substantial quarter circle and a substantial quarter ellipse, a combined shape of two substantial quarter ellipses having different long and short axes and the like. The substantial quarter circle and the substantial quarter ellipse refer to approximate quarter shapes of the whole circle and ellipse. The cross-sectional shape of the elongated lens 42 is determined by a desired angular distribution of the intensity of light which has entered the light guide 4, and is preferably formed, for example, into an elliptical shape in which a proceeding direction of the light is used as a short-axis direction in a case where a broad distribution of the light intensity is required.

Figure 10:
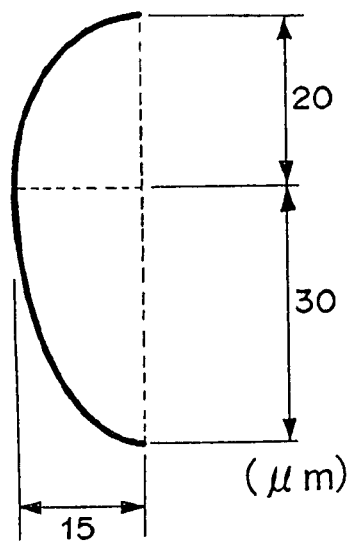
FIG. 10 is a sectional view showing a shape of an elongated lens formed on the light entrance end face of the light guide of the present invention.
Figure 12:
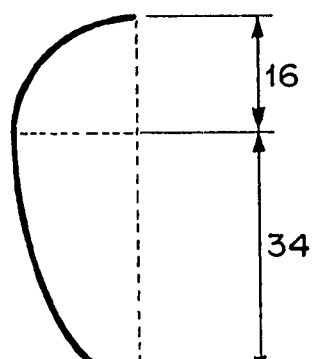
FIG. 12 is a sectional view showing the shape of the elongated lens formed on the light entrance end face of the light guide of the present invention.
Figure 11:
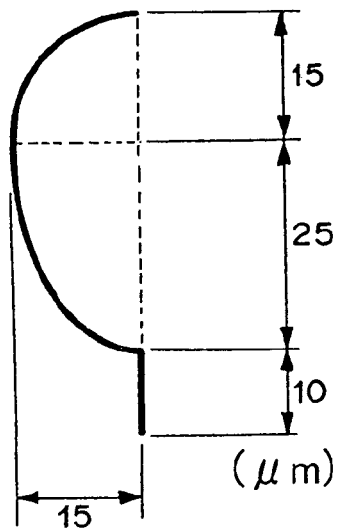
FIG. 11 is a sectional view showing the shape of the elongated lens formed on the light entrance end face of the light guide of the present invention.
Figure 11:
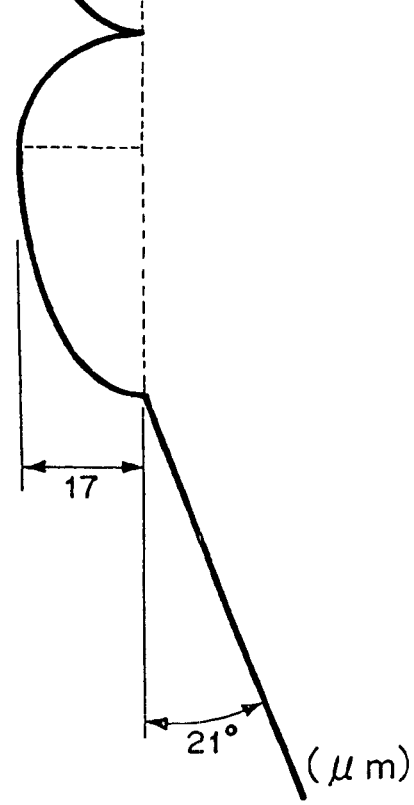
Figure 13:
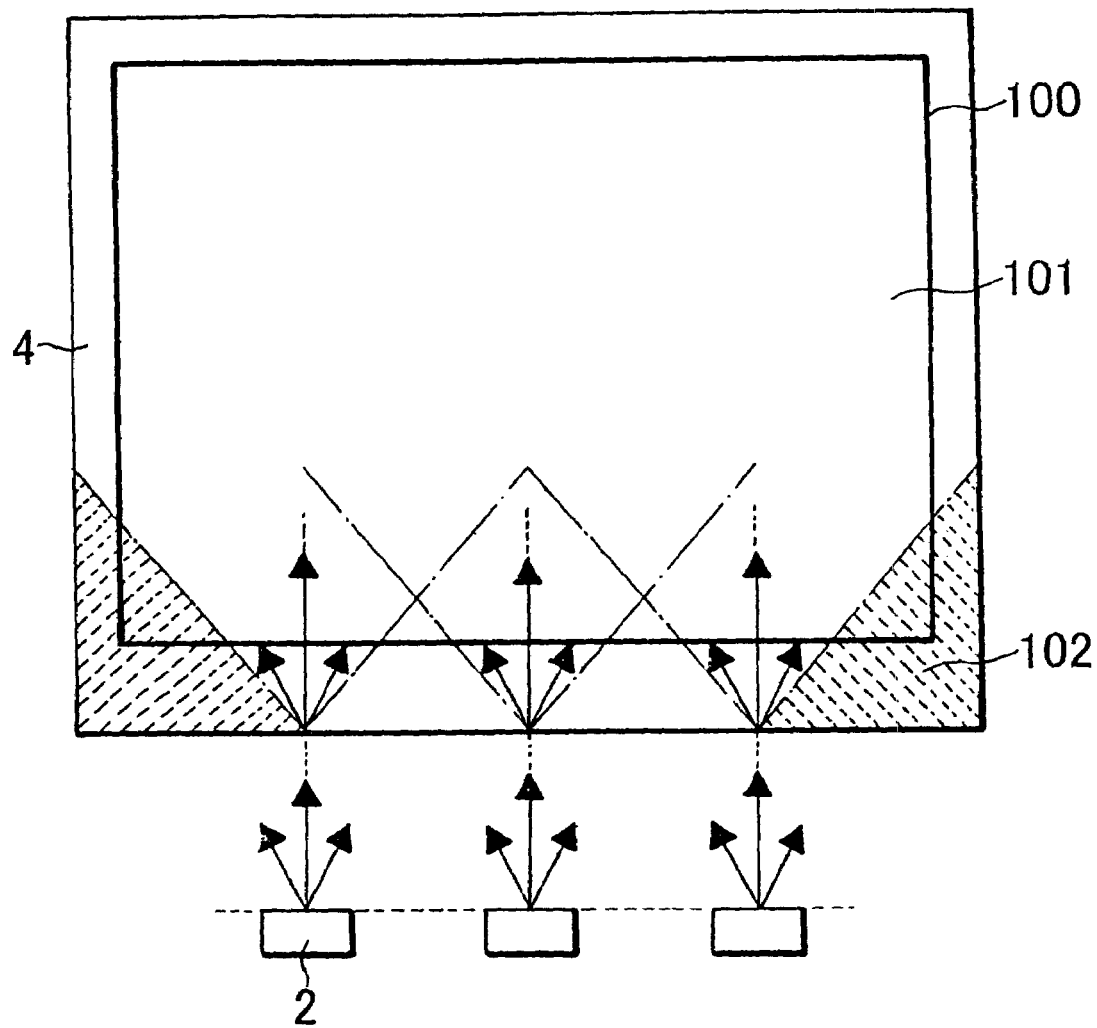
FIG. 13 is an explanatory view showing a spread of light in the light guide in a conventional planar light source device.

Concrete examples of the cross-sectional shape of the elongated lens 42 include shapes shown in FIGS. 10 to 12. A elongated lens cross-sectional shape of FIG. 10 is constituted of a combination of a quarter ellipse having a long diameter of 20 µm and a short diameter of 15 µm, and a quarter ellipse having a long diameter of 30 µm and a short diameter of 15 µm, and has a combined shape of two substantial quarter ellipses having different long diameters. The elongated lens cross-sectional shape of FIG. 11 is constituted of a combination of a quarter circle having a radius of 15 p, and a quarter ellipse having a long diameter of 25 µm and a short diameter of 15 µm. A planar portion having a width of 10 µm is disposed continuing this elongated lens. The elongated lens cross-sectional shape of FIG. 12 is constituted of a combination of a quarter ellipse having a long diameter of 17 µm and a short diameter of 16 µm, and a quarter ellipse having a long diameter of 34 µm and a short diameter of 17 µm. A plurality of elongated lenses are continuously arranged, and a planar portion having an angle of 21 degrees with respect to a elongated lens forming face is continuously disposed. It is to be noted that a part of the cross-sectional shape of the elongated lens 42 may be linear. A part of the cross-sectional shape of the elongated lens 42 is linear in this manner, accordingly shaping stability of the shape of the elongated lens 42 is enhanced, and the spread of the angular distribution of the intensity of light that has entered the light guide 4 can be easily controlled.

Figure 3:
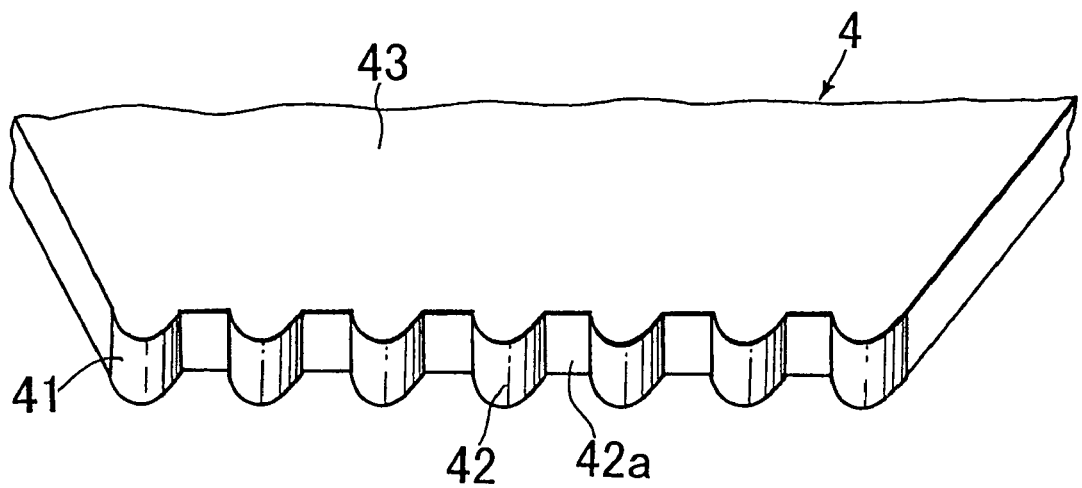
FIG. 3 is an enlarged perspective view of the light entrance end face of the light guide of the present invention.
Figure 4:
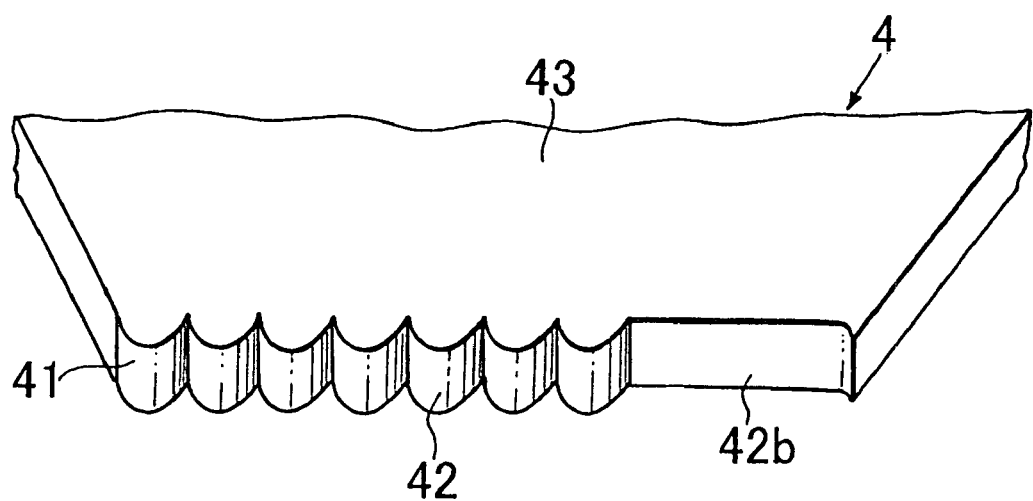
FIG. 4 is an enlarged perspective view of the light entrance end face of the light guide of the present invention.

Moreover, in the present invention, as shown in FIG. 3, a planar portion 42a or a curved portion may be formed between the adjacent elongated lenses 42. When width (dimension in a direction crossing that of the elongated lens at right angles) of the planar portion or the like formed between the elongated lenses 42 is adjusted, the angular distribution of the intensity of light can be adjusted, and the angular distribution of the light intensity optimum for setting luminance to be uniform can be obtained. In this case, the width of the formed planar portion or curved portion is preferably smaller than the pitch of the elongated lens 42 in view of a balance with an effect of broadening the angular distribution by the elongated lens 42. For example, the width is set to a range of preferably about 5 to 100 µm, more preferably 5 to 50 µm, further preferably 7 to 30 µm. As shown in FIG. 4, a portion 42b having a linear cross-sectional shape may be formed on the end portion of the light entrance end face 41. Furthermore, the elongated lens 42 may be formed only on a portion facing the disposed LED 2, or the elongated lens 42 is formed on a part of the light entrance end face and another part thereof may be formed into a planar portion as shown in FIG. 4. In this case, a ratio of a length of the planar portion with respect to a length (dimension in a direction along the light exit face) of the light entrance end face is in a range of preferably 30% or less, more preferably 15 to 20%.

In the light guide 4, one (upper face in the figure) of two main faces is constituted as the light exit face 43, and the other main face is constituted as the back face. The light guide 4 comprises a directional light output structure which outputs the light guided therein in a tilted direction (i.e., direction tilted with respect to an XY plane) with respect to the light exit face 43. The directional light output structure can be formed, for example, by forming a concave/convex shape on at least one main face of the light exit face 43 and the back face of the light guide 4, or forming a structure having a refractive index different from that of a substrate in the light guide 4 (e.g., containing light diffusing particulates having a refractive index different from that of the substrate). A plurality of directional light output structures may be combined in the light guide 4. While the light that has entered the light guide 4 travels in the light guide 4, an incident angle of the light upon the light exit face 43 is changed by the directional light output structure, and the light is output from the light exit face 43 in a case where the incident angle upon the light exit face 43 is smaller than a critical angle.

Examples of the directional light output structure formed by forming the surface of the light guide 4 into the concave/convex shape include: a lens face on which a large number of elongated lenses such as prism arrays or elongated prisms, lenticular lens arrays or elongated lenticular lenses, and V-shaped grooves are formed in parallel to each other; a rough face (mat face) or the like. In the light guide 4 provided with the directional light output structure, the direction of peak output light in the output light distribution of the output light output from the light exit face 43 preferably has an angle of 10 to 50 degrees with respect to the light exit face 43, and a half value width of the output light distribution is preferably 10 to 40 degrees.

In the present invention, in the rough face or the lens face which functions as the directional light output structure, an average slant angle or average tilt angle θa by ISO4287/1-1984 is set to a range of preferably 2 to 12 degrees, more preferably 3 to 10 degrees. This is because when the average tilt angle θa is less than two degrees, a light output ratio of the light guide 4 is reduced, an output quantity of the light becomes insufficient, and luminance tends to drop. Conversely, when the average tilt angle θa exceeds 12 degrees, the light output ratio of the light guide 4 is large, the output light quantity in the vicinity of the primary light source 2 increases, and the uniformity of the luminance in the light exit face 43 tends to drop. In the present invention, the average tilt angle θa of the rough face or the face on which the elongated lenses are formed may be uniform in the surface of the light guide 4, or may be continuously, intermittently, or partially changed. For example, it is preferable to increase the average tilt angle θa as distant from the primary light source 2 in order to enhance the uniformity of the luminance in the light exit face 43. Moreover, when there is a portion where the luminance tends to drop in the light exit face 43, the average tilt angle θa of the portion may be increased. Conversely, when there is a portion where the luminance tends to increase, the average tilt angle θa of the portion may be reduced. Accordingly the output light quantity can be partially controlled to set the luminance to be uniform.

The average tilt angle θa of the rough face or the elongated lens formed face formed on the light guide 4 can be obtained using the following equations (1) and (2) from a tilt function f(x) obtained when a face shape is measured using a probe type surface roughness meter, and a coordinate of a measurement direction is regarded as x in conformity with ISO4287/1-1984. Here, L denotes a measurement length, and Δa is a tangent of the average tilt angle θa.

$$\Delta a = (1/L) \int_0^L |(d/dx)f(x)| dx \quad (1)$$

$$\theta a = \tan^{-1}(\Delta a) \quad (2)$$

Concrete examples of the directional light output structure formed on the light guide 4 include: a plurality of arcuate elongated lenses formed substantially centering on the primary light source 2; a plurality of elongated lenses radially formed substantially centering on the primary light source 2; a plurality of band-shaped layers constituting the light guide 4, having different refractive index, and radially formed substantially centering on the primary light source 2; a plurality of elongated lenses formed substantially centering on the primary light source 2; a plurality of band-shaped layers constituting the light guide 4, having different refractive index, and radially formed substantially centering on the primary light source 2 and the like, all on the light exit face 43 and/or the back face. Above all, the plurality of arcuate elongated lenses substantially centering on the primary light source 2 (preferably arcuate elongated lenses formed concentrically) are preferable. This is because the direction of the light traveling in the light guide 4 in the XY plane is radial direction substantially centering on the primary light source 2, and does not largely change. Therefore, most of the light output from the light exit face 43 can be deflected in a desired direction by the light deflecting element 6, and there can be provided a planar light source device which has high luminance and which is superior in the uniformity of the luminance.

In the present invention, since a substantially spot-like light source such as an LED is used as the primary light source 2, the light that has entered the light guide 4 travels radially in the light guide 4 substantially centering on the primary light source 2 in substantially the same plane as that of the light exit face 43. When the arcuately formed elongated lens (arcuate elongated lens) is disposed in parallel in such a manner as to surround the primary light source 2 for the radially traveling light, most of the light traveling radially in the light guide 4 strikes on the arcuate elongated lens substantially in a vertical direction. Therefore, the light can be output in a desired direction with good efficiency regardless of the travel direction, the travel direction is easily maintained, the output light can be directed in a specific direction with good efficiency in the whole region of the light exit face 43 of the light guide 4, and the uniformity of the luminance can be enhanced. In the arcuate elongated lens, an arcuate degree is selected in accordance with the distribution of the light traveling in the light guide 4, and most of the light traveling radially in the light guide 4 preferably strikes in a vertical direction with respect to the circular elongated lens. The arcuate elongated lenses having cross-sectional shapes such as a triangular shape, a circular arc shape, a semi-circular shape, and a polygonal shape can be formed.

When the arcuate elongated lens is formed as the directional light output structure, the arcuate elongated lenses may be continuously formed, or may be formed via a flat portion between the adjacent arcuate elongated lenses in a discrete manner with respect to the distribution of a diametric direction. When the arcuate elongated lenses are continuously formed, the light output from the arcuate elongated lens sometimes strikes on the adjacent arcuate elongated lens. When a large quantity of such light exists, and disturbance of the output light distribution of the output light output from the light guide 4 enlarges. Therefore the light which is not deflected in the desired direction by the light deflecting element 6 increases, and accordingly a drop of luminance is sometimes caused. In this case, when the arcuate elongated lenses are formed in the discrete manner, the quantity of the light striking on the adjacent arcuate elongated lens again can be reduced, and the drop of the luminance by the disturbance of the distribution of the output light output from the light guide 4 can be suppressed.

Figure 5:
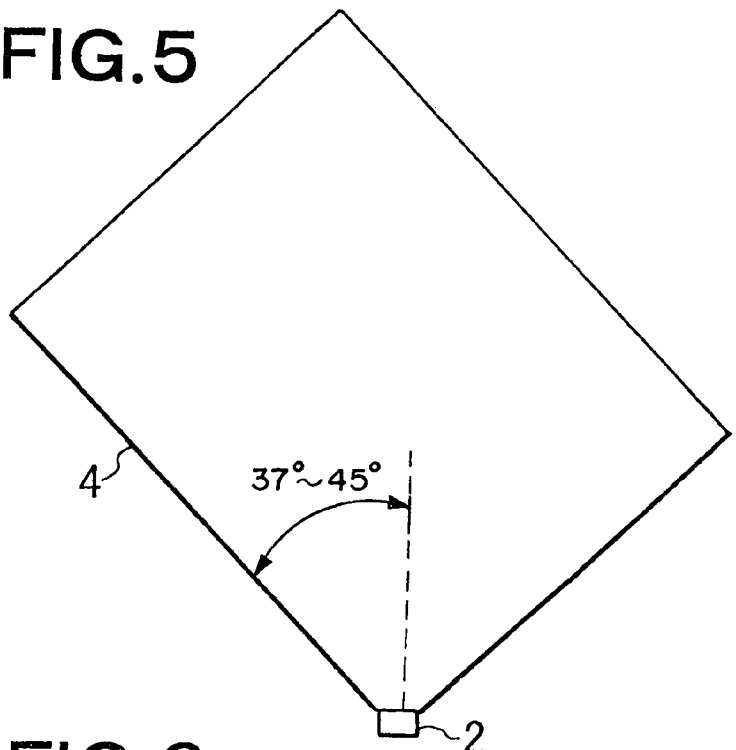
FIG. 5 is an explanatory view showing a position of a primary light source with respect to the light guide of the present invention.

In a case where the LED 2 which is the primary light source is disposed adjacent to one corner portion of the light guide 4 as in the present embodiment, an angle formed by the direction of the directivity of the light from the LED 2 with the long side of the light guide 4 is set to a range of preferably 37 to 45 degrees as shown in FIG. 5, further preferably 39 to 42 degrees. This is because when the angle formed by the direction of the directivity of the light from the LED 2 with the long side of the light guide 4 is less than 37 degrees, the angle formed by the direction of the directivity of the light from the LED 2 with the short side of the light guide 4 increases, and it tends to be difficult to prevent luminance unevenness of a region between the direction of the directivity of the light of the LED 2 and the short side. When this angle exceeds 45 degrees, the region between the direction of the directivity of the light of the LED 2 and the short side increases as compared with the region between the direction and the long side, and therefore it tends to be difficult to prevent a luminance decrease of the region between the direction of the directivity of the light of the LED 2 and the short side.

Figure 6:
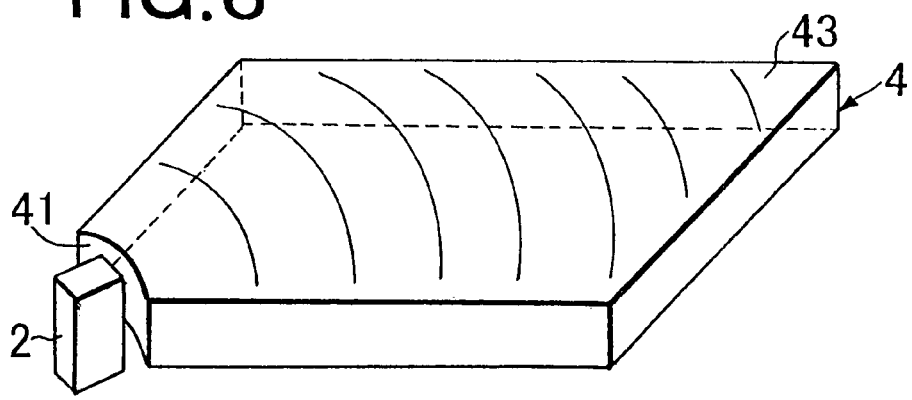
FIG. 6 is a perspective view showing the planar light source device of the present invention.
Figure 7:
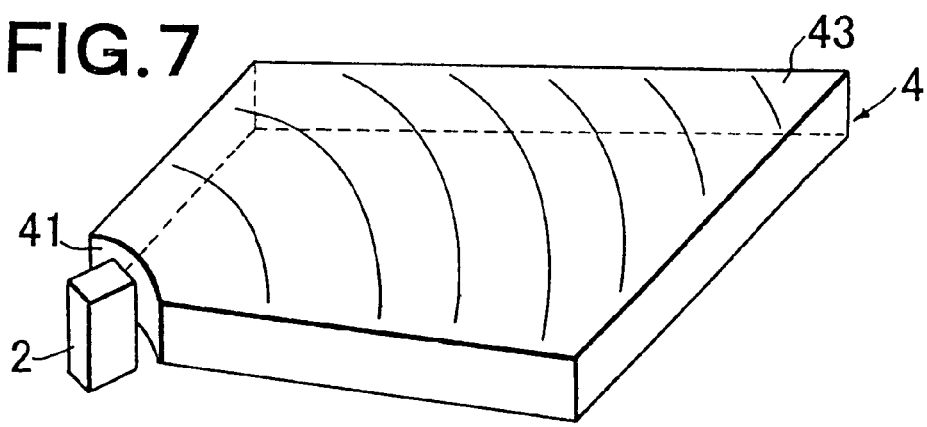
FIG. 7 is a perspective view showing the planar light source device of the present invention.

When the LED 2 is disposed adjacent to the corner portion of the light guide 4 in this manner, as shown in FIGS. 6 and 7, a large number of arcuate elongated lenses are preferably formed substantially concentrically in parallel to each other in such a manner as to surround the LED 2 on the light exit face 43 of the light guide 4. It is to be noted that in the present invention, as shown in FIG. 7, the light exit face 43 of the light guide 4 may have a substantially trapezoidal shape, and the LED 2 may be disposed adjacent to one corner portion formed by bottom sides.

Figure 8A:
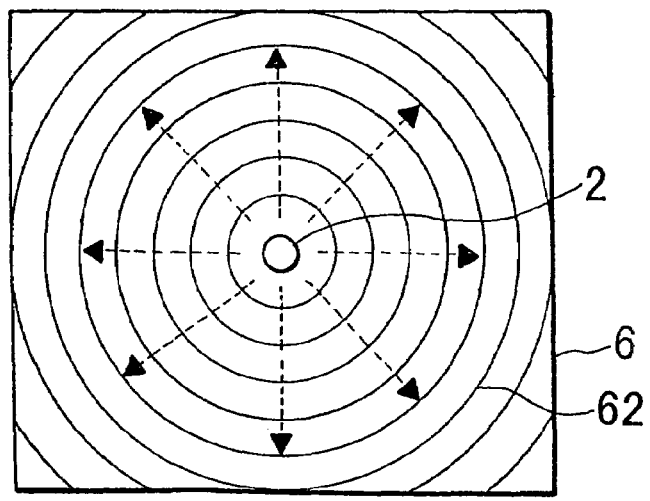
FIG. 8A is a plan view showing the planar light source device of the present invention.
Figure 8B:
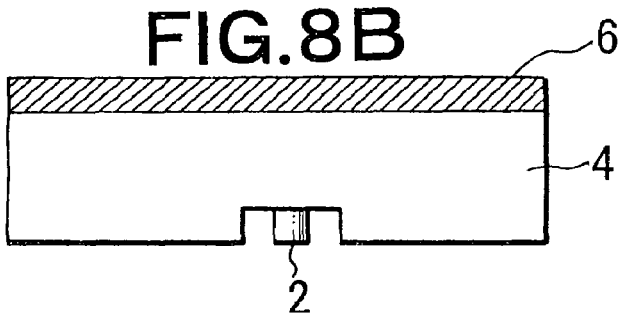
FIG. 8B is a sectional view of the planar light source device of FIG. 8A.
Figure 9:
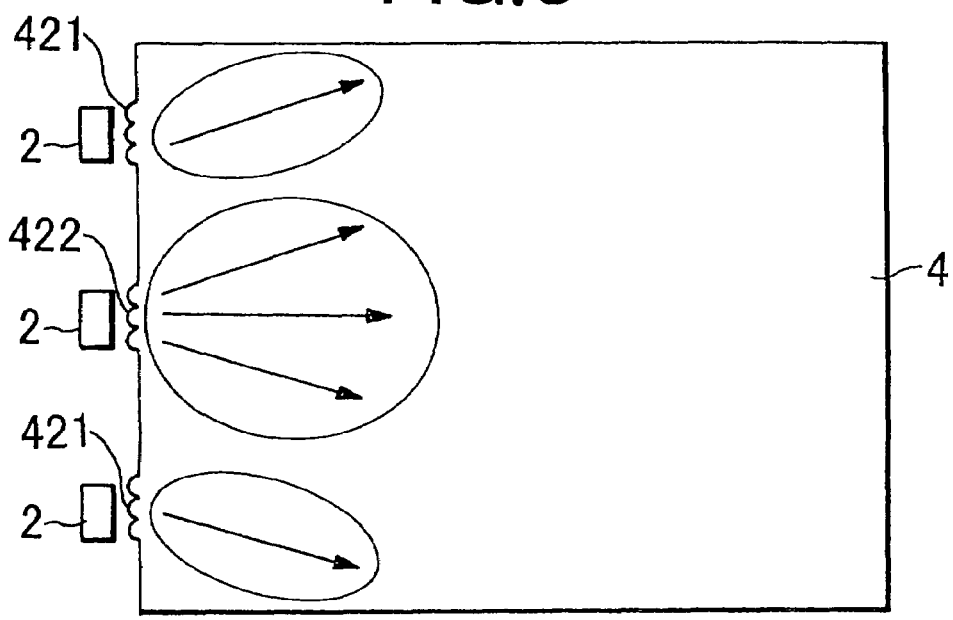
FIG. 9 is a plan view showing the planar light source device of the present invention.

In the present invention, the LED 2 which is the primary light source is not limited to be disposed at the corner portion as in the present embodiment, and may be disposed as shown in FIGS. 8A and 8B, further FIG. 9. In FIGS. 8A and 8B, the LED 2 is disposed in a concave portion disposed in the back face of the light guide 4 or a through hole formed in the light guide 4 via an air layer or a transparent material, and a large number of elongated lenses are formed in parallel substantially in the circular arc shape in such a manner as to surround the LED 3 on the light exit face 43 of the light guide 4. In FIG. 9, a plurality of LEDs 2 are arranged on one end of the light guide 4, and the elongated lens is formed on a portion of the light entrance end face 41 of the light guide 4 facing the LED 2. In this case, a elongated lens 422 having a horizontally (vertically in FIG. 9) symmetric cross-sectional shape is formed in a position facing the LED 2 positioned in the vicinity of a middle of the light entrance end face 41, and elongated lenses 421 having horizontally asymmetric cross-sectional shapes are formed in positions facing the LEDs 2 positioned in the vicinity of opposite ends of the light entrance end face 41. Accordingly, the light is horizontally symmetrically distributed by the elongated lens 422, the light is distributed in a desired horizontally asymmetric direction in a concentrated manner by the elongated lenss 421, and the uniformity ratio of the luminance can be enhanced in the whole light exit face of the light guide 4.

The light deflecting element 6 is disposed on the light exit face 43 of the light guide 4. Two main faces of the light deflecting element 6 are entirely positioned in parallel with the XY plane. One (main face positioned on the side of the light exit face 43 of the light guide) of two main faces is constituted as an input light face 61, and the other face is constituted as an output light face 62. The light deflecting element 6 performs a function of deflecting (changing the angle) the output light from the light guide 4 in a target direction, and a lens sheet or the like is usable on at least one face, having a lens face on which many elongated prisms each having two faces are arranged in parallel to each other.

In the present invention, since a substantially spot-like light source such as an LED is used as the primary light source 2, the light that has entered the light guide 4 travels in the light guide 4 radially substantially centering on the primary light source 2 in the same plane as the light exit face 43, and the output light output from the light exit face 43 is similarly output radially centering on the primary light source 2. To deflect the output light output radially in this manner in a desired direction with good efficiency regardless of the output direction, a plurality of arcuate elongated prisms formed on the light deflecting element 6 are used, and arranged in parallel to each other in such a manner as to surround the primary light source 2. When the substantially arcuate elongated prisms are disposed in parallel to each other in such a manner as to surround the primary light source 2, most of the light output radially from the light exit face 43 strikes on the elongated prism of the light deflecting element 6 in a vertical direction in the same plane as that of the light exit face 43. Therefore, the output light can be directed in a specific direction with good efficiency in the whole region of the light exit face 43 of the light guide 4, and the uniformity of the luminance can be enhanced.

For the substantially arcuate elongated prism formed on the light deflecting element 6, the degree of the arcuate shape is preferably selected in accordance with the distribution of the light traveling in the light guide 4, and most of the light output radially from the light exit face 43 preferably strikes in a vertical direction with respect to the elongated prism of the light deflecting element 6. In a concrete example, elongated prisms are concentrically arranged in parallel to each other substantially centering on the spot-like light source such as an LED in such a manner that the radius of the arc slightly increases. The range of the radius of the elongated prism is determined by a positional or dimensional relation between the position of the spot-like light source in a planar light source device system, and an effective area of a planar light source device corresponding to a liquid crystal display area.

Moreover, the pattern of the elongated prism formed on the light deflecting element 6 can be appropriately set in such a manner that most of the light output radially from the light exit face 43 strikes on the elongated prism of the light deflecting element 6 substantially in a vertical direction in accordance with a method of arranging the primary light sources 2. Furthermore, the elongated prism formed on the light deflecting element 6 may be formed on the input light face 61 of the light deflecting element 6 facing the light exit face 43 of the light guide 4, may be formed on the output light face 62, or may be formed on both the input light face 61 and the output light face 62. The elongated prism is preferably formed on the input light face 61 of the light deflecting element 6 in order to deflect the output light having high directivity from the light guide 4 in a desired direction with good efficiency, to thereby obtain high luminance.

The light deflecting element 6 in which the elongated prism is formed on the input light face 61 is disposed on the light exit face 43 of the light guide 4. In this case, the output light output from the light exit face 43 strikes on the light deflecting element 6 from the face (prism face) of each elongated prism closer to the primary light source 2. After the light is internally reflected by a face (prism face) distant from the primary light source 2, and deflected in a desired direction, the light is output from the output light face 62 of the light deflecting element 6. Therefore, the output direction can be changed to a desired direction in a state in which the degree of directivity of the output light output from the light exit face 43 of the light guide 4 is substantially maintained, utilization efficiency of the light increases, and a planar light source device system having high luminance can be obtained.

As to the output light output from the light exit face 43 of the light guide 4, peak light of the output light distribution has a direction tilted by 10 to 50 degrees with respect to the light exit face 43, and therefore an angle formed by the face of the elongated prism distant from the primary light source 2 with a reference plane of the light deflecting element 6 is preferably 40 to 80 degrees, more preferably 50 to 65 degrees, further preferably 55 to 65 degrees. This is because when the angle formed by the face distant from the primary light source 2 with the reference plane of the light deflecting element 6 is set to this range, the output light from the light guide 4 having the above-described directivity can be deflected and output in the vicinity of a normal direction of the output light face 62 of the light deflecting element 6. Here, the reference plane of the light deflecting element 6 is a plane obtained in a case where it is assumed that the face on which the elongated prism of the light deflecting element 6 is formed is smooth.

On the other hand, since a part of the light traveling in the light guide 4 reaches the terminal end of the light guide 4, the light reflected by the end face and returned exists. The light travels in the light guide 4 toward the light entrance face of the light guide 4, and the light is output from the light exit face 43 by the directional light output structure formed on the light guide 4. This output light enters the prism face of the light deflecting element 6 on the side distant from the primary light source 2. The light is internally deflected in a desired direction by the prism face on the side closer to the primary light source 2, and output from the output light face 62 of the light deflecting element 6. Also with regard to this output light, the peak light of the output light distribution has a direction tilted by 10 to 50 degrees with respect to the light exit face 43. Therefore, when there is comparatively much output light, the angle formed by the prism face closer to the primary light source 2 of the elongated prism with the reference plane of the light deflecting element 6 is preferably 40 to 80 degrees in the same manner as in the prism face distant from the primary light source 2, more preferably 50 to 65 degrees, further preferably 55 to 65 degrees.

The angle formed by two prism faces with respect to the reference plane of the light deflecting element 6 may be the same or different. When both the angles are different, a difference is preferably 10 degrees or less, more preferably 5 degrees or less, further preferably 2 degrees or less.

In the present invention, the cross-sectional shape of the prism face of the elongated prism formed on the light deflecting element 6 is formed into an outward convex curved or polygonal shape in an application in which there is a high demand for reduction of power consumption and enhancement of luminance, such as a planar light source device system of a portable electronic apparatus such as a cellular phone or a portable information terminal. Accordingly, the light is preferably deflected in such a manner as to be concentrated in a desired direction during inner-face reflection by the prism face. Accordingly, since the light is output as concentrated light having higher directivity from the light deflecting element 6, luminance per power consumption can be raised, and the reduction of power consumption and the raising of the luminance can be promoted.

The light guide 4 and the light deflecting element 6 of the present invention can be made of a synthetic resin having high transmittance. Examples of the synthetic resin include a methacrylic resin, acrylic resin, polycarbonate-based resin, polyester-based resin, vinyl chloride based resin, and annular polyolefin resin. Especially, the methacrylic resin has a high transmittance, and superior resistance to heat, dynamic characteristic, and molding workability, and is optimum. As the methacrylic resin, a resin containing methyl methacrylate as a main component and containing 80% by weight or more methyl methacrylate is preferable. The surface structures of the rough faces of the light guide 4 and the light deflecting element 6, or the surface structures of the elongated prism and the like may be formed by thermal pressing of a transparent synthetic resin plate using a mold member having a desired surface structure, or may be shaped simultaneously with the forming by screen printing, extrusion forming, injection forming or the like. The surface structure may be formed using a thermal or photo setting resin or the like. Furthermore, a rough face structure or an elongated lens arrangement structure comprising an active energy ray setting resin may be formed on the surface of a transparent substrate such as a transparent film or sheet formed of a polyester-based resin, acrylic resin, polycarbonate-based resin, vinyl-chloride-based resin, polymethacrylic imide based resin or the like. Alternatively, this sheet may be bonded/integrated onto a separate transparent substrate by a method such as bonding or fusion bonding. As the active energy ray setting resin, a multifunctional (meth)acrylic compound, vinyl compound, (meth)acrylic esters, aryl compound, metal salt of (meth) acrylic acid or the like is usable.

As the light reflecting element 8, for example, a plastic sheet having a metal evaporated reflective layer on its surface may be used. A reflective member is preferably attached to the side end face (excluding the light entrance end face 41) of the light guide 4.

As the primary light source 2, an LED light source is preferable in view of power consumption or the like, and another substantially spot-like light source such as a halogen lamp may be used. As the substantially spot-like primary light source 2, a light source of monochromatic light, a white light source having light with wavelengths of three primary colors of red, green, blue or the like may be used. In the present invention, one or a plurality of substantially spot-like light sources may be used as the primary light source 2. When a plurality of substantially spot-like light sources are disposed and used close to each other at one corner portion or the end face, an LED array or the like obtained by arraying a plurality of substantially spot-like light sources may be used as the spot-like light source.

As the primary light source 2, a light source having an optimum light emission pattern (output light distribution) is preferably used in accordance with purposes or required characteristics. In general, in order to alleviate phenomenon in which luminance of a portion in front of the primary light source 2 becomes higher than that of another portion, spread of the light emission pattern is preferably large in a direction (a-direction) parallel to the light exit face 43 of the light guide 4, and a peak half value width of the light emission pattern is preferably about 120 to 180 degrees. When the primary light source 2 is disposed adjacent to the end face of the light guide 4, the light emission pattern having a large spread in the a-direction is preferably used, and the peak half value width is preferably about 140 to 180 degrees. When the primary light source 2 is disposed adjacent to the corner portion of the light guide 4, the light that has entered the light guide 4 preferably spreads toward the whole surface of the light guide 4 in the a-direction, and a spread angle of the entered light preferably agrees with the spread of the face of the light guide 4. Therefore, when the corner portion of the light guide 2 receiving the light has an angle of 90 degrees, the peak half value width of the light emission pattern of the primary light source 2 in the a-direction is preferably about 20 to 70 degrees.

Moreover, as to the light emission pattern in a direction (b-direction) vertical to the light exit face 43 of the primary light source 2, the peak half value width is preferably about 10 to 120 degrees. This is because the light excessively spreading in the b-direction is easily output in the vicinity of the primary light source 2, and the uniformity of the luminance tends to drop. When the light emission pattern in the b-direction is excessively narrow, the output ratio from the light guide 4 decreases, and the luminance tends to drop.

EXAMPLES

The present invention will be concretely described hereinafter in accordance with examples.

Example 1

Preparation of Light Guide

A transfer pattern for forming a light guide surface structure was cut on a mirror-finished surface of a brass plate having an outer shape dimension of 48 mm×34 mm and a thickness of 3 mm at an effective region having a dimension of 40 mm30 mm to obtain a mold. In the surface structure, circular elongated prisms were concentrically formed centering on the vicinity of one corner portion in parallel to each other centering on the vicinity of one corner portion of rectangular outer shape having a dimension of 48 mm×34 mm, each having a cross-sectional shape of an isosceles triangle having an apex angle of 160 degrees and a bottom side dimension of 30 µm, and flat portions each having a width of 30 to 200 µm was formed between adjacent circular arc elongated prisms in such a manner that an interval was gradually narrowed from a central portion. Injection forming was performed using the above obtained mold and a mold formed of the brass plate having the mirror-finished surface and an outer shape dimension of 48 mm×34 mm and a thickness of 3 mm, and a light guide having a rectangular plate shape with a long side of 48 mm, a short side of 34 mm, and a thickness of 0.8 mm was obtained. As a material of the injection forming, polymethyl methacrylate was used.

One face of the obtained light guide was a smooth face, and a circular arc prism pattern shown in FIG. 6 was formed on the other face. The corner portion constituting a center of the circular arc elongated prism of the light guide was cut into a plane shape having an end face length of 4mm to form a cutout portion, and a light guide end of this portion was constituted as a light entrance end face. A pattern constituted of elongated lenses each having a combined shape of a quarter circle having a radius of 15 µm and a quarter ellipse having a long diameter of 25 µm and a short diameter of 15 µm as shown in FIG. 11, and a plane having a width of 10 µm was thermally transferred onto the whole light entrance end face using a mold in which the above pattern was formed.

Preparation of Light Deflecting Element

A transfer pattern for forming a surface structure of a light deflecting element was cut on a mirror-finished surface of a brass plate having an outer shape dimension of 48 mm×34 mm and a thickness of 3 mm to obtain a mold. The surface structure comprised circular arc elongated prisms concentrically arranged at a pitch of 50 µm in parallel to each other centering on the vicinity of one corner portion of rectangular outer shape having a dimension of 48 mm×34 mm, each having a cross-sectional shape of a substantial isosceles triangle of an apex angle of 65.4 degrees whose two inclined faces were convex curved faces having a curvature radius of 400 µm. After injecting acrylic ultraviolet setting composition into the obtained mold, and superimposing a polyester film (A4000 [trade name] manufactured by Toyobo Co., Ltd., refractive index of 1.600) having a thickness of 188 µm, ultraviolet rays were applied through the polyester film using a high-pressure mercury lamp to cure the acrylic ultraviolet setting composition, and the obtained cured material was peeled from the mold to obtain a prism sheet. In the obtained prism sheet, the circular arc elongated prisms formed of a ultraviolet setting resin having a refractive index of 1.528 and having a pitch of 50 µm were formed in which the circular arc elongated prisms were concentrically arranged in parallel to each other centering on the vicinity of one corner portion on one face of the polyester film. The cross-sectional shape of the circular arc elongated prism was substantially an isosceles triangle whose two prism faces via an apex angle of 65,4 degrees were convex curved faces having a curvature-radius of 400 µm.

Preparation of Planar Light Source Device

A light diffusion reflective film (SU-119 [trade name] manufactured by Tsujimoto Denki Seisakusho Co., Ltd.) was disposed facing the face of the obtained light guide on which the arcuate elongated prism was formed. The obtained prism sheet was disposed facing a smooth face constituting a light exit face of a light guide in such a manner that the face on which the circular arc elongated prism was formed was on the side of the light guide, and a corner portion constituting a center of the formed circular arc elongated prism was superimposed upon a cutout portion of the light guide. Moreover, in the cutout portion of the light guide, one LED light source whose peak half value width of a direction parallel to the light exit face of the light guide was 115 degrees (±57.5 degrees) and whose peak half value width of a vertical direction was 110 degrees (±55 degrees) was disposed in such a manner that an angle formed by the direction of directivity of the LED light source and the long side of the light guide was 40 degrees, and the LED light source was driven with a current of 15 mA.

Evaluation

An obtained planar light source device was lit and observed, and development of luminance unevenness was hardly visually recognized.

INDUSTRIAL APPLICABILITY

As described above, according to the present invention, even when a comparatively small number of spot-like light sources are used as primary light sources, there can be a high-quality planar light source device having high uniformity without any luminance unevenness especially in a region distant from the spot-like light sources. Therefore, the present invention is preferably utilized in a liquid crystal display device for use in a notebook-size personal computer, liquid crystal television or the like, and a comparatively small liquid crystal display device using a substantially spot-like primary light source such as an LED, for use as a display for portable electronic devices such as a cellular phone, a portable information terminal, and a portable game machine, or an indicator for various electric/electronic devices.

The invention claimed is:

1. A planar light guide for a planar light source device, having a light entrance end face receiving light from a substantially spot-like primary light source and a light exit face outputting the light which is incident on the light entrance end face, wherein a plurality of elongated lenses are formed on the light entrance end face to extend substantially in parallel with one another from the light exit face toward the opposite face, and include first elongated lenses and second elongated lenses, wherein the first elongated lenses each having a symmetric cross-sectional shape are arranged in the vicinity of a middle of the light entrance end face concerning a direction along the light exit face, and the second elongated lenses each having an asymmetric cross-sectional shape are arranged in the vicinity of opposite ends of the entrance end face concerning a direction along the light exit face.

2. The light guide for the planar light source device according to claim 1, wherein the cross-sectional shape of each of the elongated lenses having the asymmetric cross-sectional shape is constituted of combination of at least two different arcs andlor non-arcs.

3. The light guide for the planar light source device according to claim 1, wherein the cross-sectional shape of each of the elongated lenses having the asymmetric cross-section shape is constituted of combination of a part of an arc and a part of an ellipse.

4. The light guide for the planar light source device according to claim 1, wherein the cross-sectional shape of each of the elongated lenses having the asymmetric cross-sectional shape is constituted of combination of a quarter circle and a quarter ellipse.

5. light guide for the planar light source device according to claim 1, wherein the cross-sectional shape of each of the elongated lenses having the asymmetric cross-sectional shape is constituted of combination of two quarter ellipses.

6. The light guide for the planar light source device according to claim 1, wherein a planar portion or a curved portion having a width smaller than that of the elongated lenses is formed between the adjacent elongated lenses having the asymmetric cross-sectional shape.

7. A planar light source device comprising: the light guide according to any one of claims 1 and 2-6, a primary light source disposed in such a manner as to face the light entrance end face of the light guide; and a light deflecting element disposed so as to face the light exit face of the light guide.

8. The planar light source device according to claim 7, wherein the light deflecting element comprises a lens sheet.

* * * * *